UNITED STATES PATENT OFFICE.

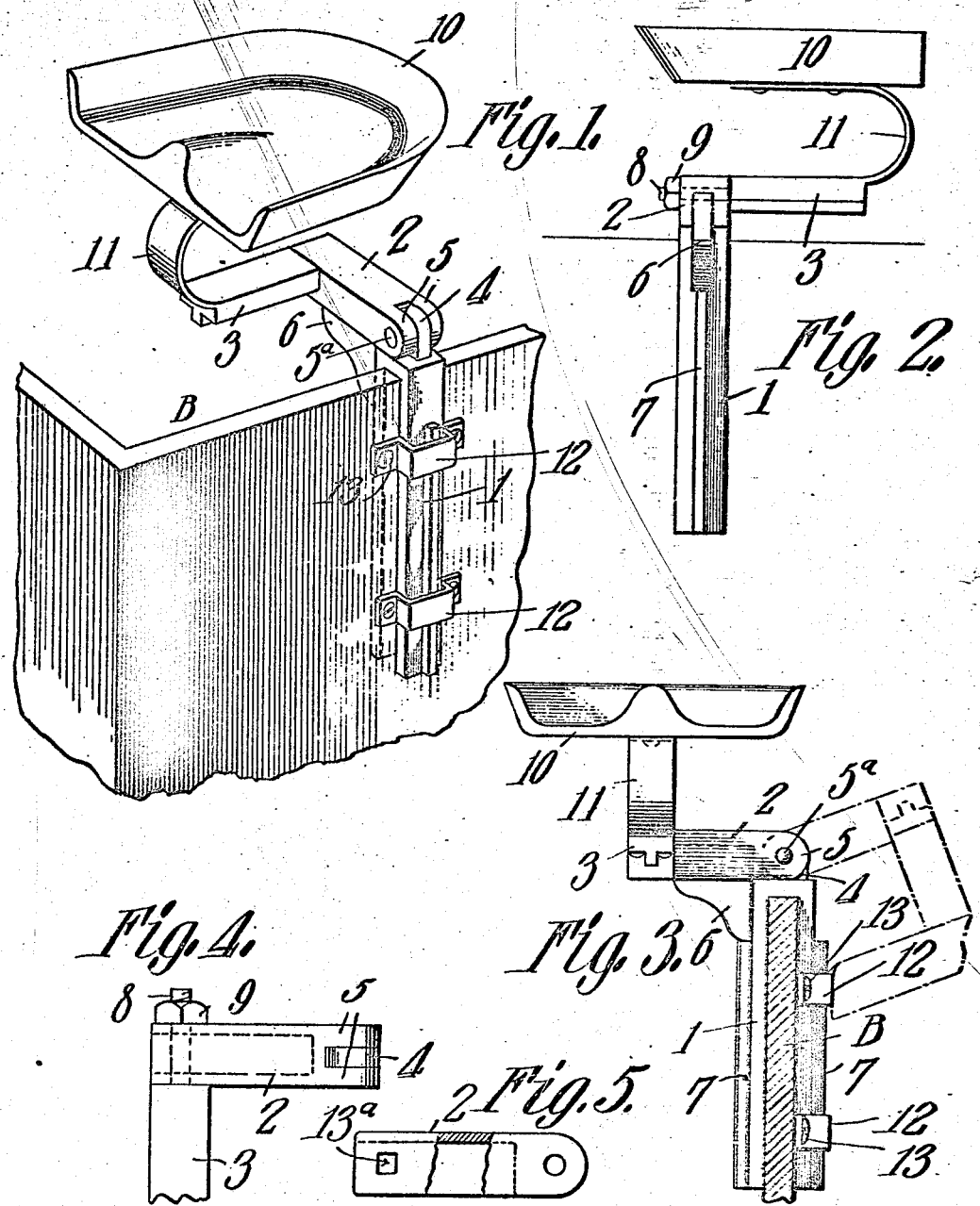

NORVAL P. ROGERS, OF JEFFERSON, PENNSYLVANIA.

WAGON-SEAT.

No. 895,042.  Specification of Letters Patent.  Patented Aug. 4, 1908.

Application filed September 9, 1907. Serial No. 391,969.

*To all whom it may concern:*

Be it known that I, NORVAL P. ROGERS, a citizen of the United States, residing at Jefferson, in the county of Green and State of Pennsylvania, have invented a new and useful Wagon-Seat, of which the following is a specification.

This invention relates, generally, to wagon seats, and more particularly to one adapted for use in connection with farm wagons.

The object of the invention is to provide a seat of this character which may be readily attached to or detached from the wagon body so as to occupy a position either on the right or left hand side of a wagon, and which shall be capable of being folded down against the side of the wagon body thus to be out of the way when the body is being filled with any substance.

A further object is to provide a seat of this character which shall combine simplicity of construction, high efficiency and durability in use, and which may readily be manufactured and applied.

With the above and other objects in view, as will appear as the nature of the invention is better understood, the same consists in the novel construction and combination of parts of a wagon seat, as will be hereinafter fully described and claimed.

In the accompanying drawings forming a part of this specification and in which like characters of reference indicate corresponding parts,—Figure 1 is a view in perspective exhibiting a portion of the wagon body with the improved seat applied thereto. Fig. 2 is a view in side elevation. Fig. 3 is an end view, displaying in dotted lines the position occupied by the seat when not in use. Fig. 4 is a fragmentary detail view. Fig. 5 is a view in side elevation, partly in section, of one of the members of the seat.

The article comprises a clip 1, a bracket 2 pivotally connected therewith, and a seat-carrying arm 3 which is detachably assembled with the bracket.

For purposes of strength, together with lightness, it is preferred that the clip, bracket and seat-supporting arm be made of structural steel, the clip and arm being T-shaped in cross section and the bracket of channel iron.

The connection between the clip and the bracket is secured by providing the former with a perforated lug 4, that works between two ears 5 on the outer end of the bracket and is held assembled therewith by a bolt or rivet 5ª. The bracket carries a stop or abutment 6, which when the seat is in operative position engages with one side of the clip, as shown in Fig. 3, the ribs or fins 7 of the clip members being cut away to permit the bracket to engage with the clip.

The arm 3 is provided with a reduced terminal 8 that projects through an orifice formed in the free end of the bracket for the purpose, and is held assembled therewith by a nut 9.

The seat 10 may be of the character shown or otherwise, and is firmly bolted to a U-shaped spring 11 that preferably, though not necessarily, forms an integral extension of the arm 3.

As shown in Fig. 3, the clip straddles the side of the wagon body B, and may be held against movement relatively thereto in any preferred manner, as by the employment of strap staples 12, which embrace the outer member of the clip and are bolted at 13 to the sides of the wagon body. Any number of these staples may be employed, two in this instance being shown.

The orifice 13ª in the bracket 2 that receives the reduced extension 8 of the arm is polygonal in order to prevent any rocking movement of the seat when once positioned. As shown in Fig. 3, when the seat is not in use or when the wagon body is being loaded the seat may be turned down against the outer side of the body and thus be out of the way.

As will be obvious, the seat is capable of being shifted from one side of the wagon body to the other merely by loosening the nut 9, reversing the position of the arm 3 relatively to the bracket and then again seating the nut.

The means herein defined are simple in character, will be found thoroughly efficient for the purposes designed and will result in the production of a strong, durable and readily applied seat.

What is claimed is:—

A wagon seat comprising a bifurcated clip arranged to straddle the side board of a wagon body, and provided at one end with a lug, a bracket slotted at one end to receive the lug and being pivotally connected therewith and provided in its other end with a transversely disposed polygonal orifice, an arm having at one end a reduced polygonal extension to engage the orifice, whereby to prevent the arm from having any rocking movement when in use, means for clamping the extension within the orifice, a curved
5 spring carried by the other end of the arm, and a seat secured to the spring.

In testimony that I claim the foregoing as my own, I have hereto affixed my signature in the presence of two witnesses.

NORVAL P. ROGERS.

Witnesses:
 EDNA PRYOR,
 S. M. SMITH.